UNITED STATES PATENT OFFICE.

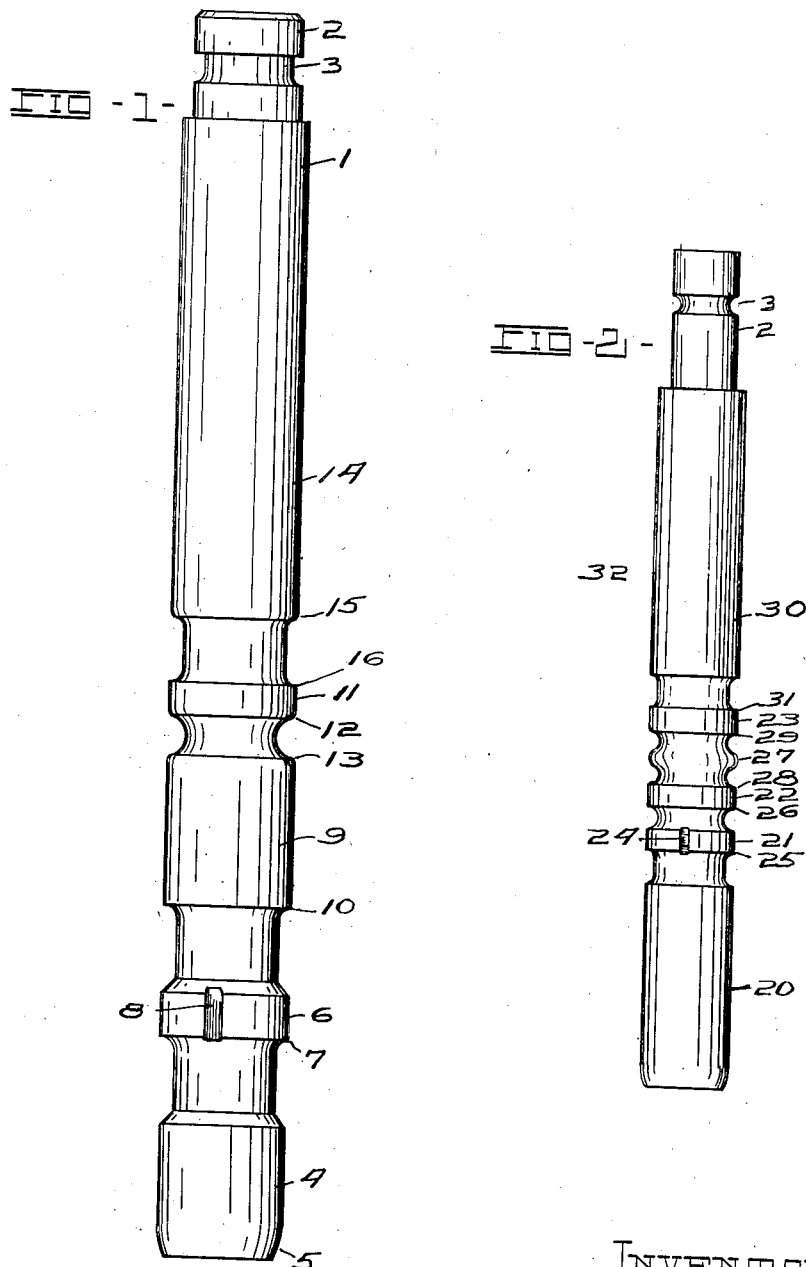

AUGUSTUS F. DONALDSON, OF TOLEDO, OHIO, ASSIGNOR TO THE BUNTING BRASS & BRONZE COMPANY, OF TOLEDO, OHIO, A CORPORATION OF OHIO.

BROACH.

1,336,621.   Specification of Letters Patent.   Patented Apr. 13, 1920.

Application filed May 24, 1919. Serial No. 299,509.

*To all whom it may concern:*

Be it known that I, AUGUSTUS F. DONALDSON, a citizen of the United States, and a resident of Toledo, in the county of Lucas and State of Ohio, have invented certain new and useful Broaches; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide a broach for forming bushings. The broach involving my invention is particularly adapted for forming bearing surfaces. True cylindrical bearings will be formed with a smooth compacted surface which will thereby produce an efficient bearing for shafts and the like. My invention may be embodied in a broach for forming Babbitt bearings or in a broach for forming bronze bearings, the broach for the bronze bearing being slightly modified from the broach for Babbitt bearings because of the different characteristics of the two metals.

My invention may be modified by those skilled in the art without departing from the spirit thereof. I shall describe hereinafter constructions containing my invention as illustrative of such constructions. The constructions selected are shown in the accompanying drawings.

Figure 1 of the drawings is a side view of a broach for broaching a Babbitt metal bushing or a bushing having a Babbitt bearing, and Fig. 2 is an illustration of a broach for bronze bushings.

1, in the drawings, is the Babbitt bearing broach which is provided with a suitable head 2 having a locking channel 3 for locking the broach into a suitable ram or plunger used in the broaching operations of the broach. The bushing is placed upon a suitable bed of the plunger press machine and the ram forces the broach through the bushing and then by a suitable stripper device well known in the art, the broach is pulled from the bushing.

The broach 1 for broaching Babbitt bearings is provided with a pilot 4 that first enters the bushing. The pilot 4 is provided with a tapered or rounded nose 5 for centering the bushing with respect to the broach. The broach is also provided with a ridge 6 having a cutting edge 7. The cutting edge 7 of the ridge is larger in diameter than the pilot 4 by an amount which varies according to the amount of metal that is to be removed from the bushing. This amount will depend upon the irregularities that the bushing may have before it is broached. The difference in size between the pilot and the cutting edge 7 may also depend upon the eccentricity, or out of roundness, of the inner surface of the bushing. Ordinarily the pilot is about 3-1000ths smaller than the cutting edge 7 of the pilot. The ridge 6 may be provided with channels 8 that may be located 120 degrees apart around the ridge. The channels 8 prevent the formation of chips that form complete rings or circles around the broach, that is, the channels break up the continuity of the chips formed by the ridge 6.

The ridge 6 is followed by a broad cylindrical burnishing portion 9 that also has a cutting edge 10. The cutting edge 10 has the diameter the same as the cutting edge 7. The cutting edge 10 and the following broad burnishing surface 9 operate to make a substantially perfect cylindrical surface. The cutting edge 10 operates to cut the bushing not only where it has been left by the channels 8 of the ridge 6 but also removes some metal from the entire inner cylindrical surface of the bushing. The edge 10 is formed without any "rake" and consequently the square edge 10 scrapes over the surface of the bushing to remove not only the material left by the channels 8 but also to glaze over the surface while at the same time it is being burnished on the inner surface with the broad surface of the cylindrical portion 9.

The broach is also provided with a ridge 11 which is located above the burnishing barrel or portion 9. The ridge 11 is larger than the cutting edges 7 and 10. This difference in size may vary according to the diameter of the broach, that is, according to the diameter of the bearing surfaces of the bushings. In a one-inch broach the ridge 11 may be 3-1000ths of an inch larger than the diameter of the cutting edges 7 and 10 and of the broad burnishing surface 9. The ridge 11 is located quite close to the broad burnishing surface 9 and is provided with a rounded edge 12 while the following or uppermost edge of the burnishing surface 9 is also provided with a rounded edge 13. The bearing, while being operated on by the burnishing surface of the cylindrical portion 9 is compressed against the burnishing surface, consequently the metal to a considerable depth in the bearing is compressed by the cylindrical portion 9 and as the broach is passed through the bearing the metal of the bushing passes over the rounded edge 13 and also over the rounded edge 12 of the bead 11 whereby a compacting or kneading operation is produced on the surface of the bushing. The diameter of the ridge 11 being considerably larger than the diameter of the cylindrical portion 9, the metal is slightly distended so that the compacting action of the edge 12 is much greater than the compacting action of the edge 13. The bushing then passes on to the long cylindrical surface of the shank 14 of the bushing. The leading edge 15 of the shank 14 is rounded in order that the bushing may be readily received onto the shank. The shank 14 is smaller than the cutting edges 7 and 10. The difference in the diameters of the shank 14 and the burnishing portion 9 of the broach varies according to the size of the bushing operated upon by the broach. For a one-inch bushing the shank may be 3-1000ths of a size smaller than the cutting edges and the barrel 9 and consequently 6-1000ths smaller in diameter than the ridge 11.

If the bushing were removed from the broach by slipping it off the upper end of the shank without drawing the broach from the bushing so as to cause the parts below the shank to pass over the bearing surface of the bushing, it would be found that the bushing was slightly tapered owing to the tendency of the metal to squeeze by the cutting and compacting edges of the ridges. In other words there is a tendency of the metal to work down toward the lower end so as to make the diameter of the interior of the bushing at the lower end smaller than the diameter at the upper end. When, however, the broach is pulled from the bushing the ridge 11 cuts away a large part of the surplus material which squeezes into the lower end of the bushing. The ridge 11 is provided with a cutting edge 16. The bushing then passes over the rounded edges 12 and 13 of the ridges 11 and 9 and the metal is again kneaded and consequently compacted. It then passes over the barrel or burnishing surface whereby the metal is evenly distributed over the bushing and its surfaces burnished, the diameter of the finished bushing being the same as that of the burnishing barrel or cylindrical portion 9. The cutting edge 7 having very slight rake does not affect the surface of the bearing.

It will be found therefore that when the bushing is removed from the pilot 4 that the bearing is a true cylindrical bearing having a highly polished burnished and compacted surface and compressed body which forms an exceedingly efficient bearing.

In the form of the broach illustrated in Fig. 2, which is particularly adapted for forming bearing surfaces on bronze bushings, the bushing is also cut on the return stroke of the broach as well as on the downward stroke of the broach. The broach 32 shown in Fig. 2 is provided with a pilot 20 and cutting ridges 21, 22 and 23. If desired, the cutting ridge 21 may be channeled by the channels 24 that operate to break up the continuity of the chips and prevent the formation of complete circular chips whereby the chips may fall in the space between the pilot 20 and the cutting ridge 21. The edge 25 of the cutting ridge operates to cut the bushing and likewise the edge 26. The diameter of these ridges increase successively from the pilot 20. The broach is also provided with a bead 27 which is located intermediate the cutting ridges 22 and 23. It operates to knead the interior surface of the bushing. The diameter of the bead 27 is slightly larger than the diameter of the cutting ridge 22. The cutting ridge 23, however, is slightly less in diameter than the bead. The following edge 28 of the ridge 22 and the leading edge 29 of the ridge 23 are slightly rounded and coöperate to a slight extent in the kneading operation performed by the bead 27 since the metal is in a stretched condition by being forced over the cutting ridges and is released as it passes over the edge 28. It is subsequently operated upon by the bead 27 and passes over the rounded edge 29 of the cutting ridge 23 although the rounded edges 28 and 29 being slightly smaller their action on the bushing is slight owing to the fact that the bead 27 being larger the bushing is distended and notwithstanding its elastic character does not return sufficiently to permit very efficient operations of the edges 28 and 29.

The shank 30 then passes into the bushing. It has a diameter that is slightly less than the diameter of the ridge 23 and a diameter that is substantially the same as the cutting ridge 22. Upon the return of the broach the bushing is operated upon by the cutting edge 31 located on the cutting ridge 23 which again cuts the surface of the bushing. The bead 27 operates upon the bushing and compacts its surfaces. The surface of the ridge 22 does not materially operate upon the bushing since the material of the bushing is practically lifted from the ridge 22 by the distending action of the compacting bead 27 and considerable metal has been removed by the cutting edge 31.

The bushing when completed will have a diameter slightly less than the cutting ridge 31.

I claim:—

1. In a broach for forming bearings, a pair of ridges having a cutting edge, a bead and a shank, the bead located intermediate the cutting edge and the shank, the diameter of the bead being greater than the diameter of the cutting edge and the shank.

2. In a broach for forming bearing surfaces in bushings, ridges, one of the ridges having a cutting edge on the leading side of the ridge, and another ridge having a cutting edge on the following side of the ridge.

3. In a broach for forming bearing surfaces in bushings, ridges, one of the ridges having a cutting edge on the leading side of the ridge, and another ridge having a cutting edge on the following side of the ridge, and a compacting means located intermediate the said ridges.

4. In a broach for forming bearing surfaces in bushings, a burnishing member having a broad burnishing surface and a shank, a ridge located intermediate the burnishing surface and the shank, the ridge having a rounded leading edge.

5. In a broach for forming bearing surfaces in bushings, a burnishing member having a broad burnishing surface and a shank, a ridge located intermediate the burnishing surface and the shank, the ridge having a rounded leading edge, and a following cutting edge.

6. In a broach for forming bearing surfaces in bushings, a burnishing member having a broad burnishing surface and a shank, a ridge located intermediate the burnishing surface and the shank, the ridge having a rounded leading edge, the diameter of the ridge being greater than the diameters of the burnishing surfaces of the shank.

7. In a broach for forming bearing surfaces in bushings, a burnishing member having a broad burnishing surface and a shank, a ridge located intermediate the burnishing surface and the shank, the ridge having a rounded leading edge, and a following cutting edge, the diameter of the ridge being greater than the diameter of the burnishing surfaces and the shank.

In testimony whereof I have hereunto signed my name to this specification.

AUGUSTUS F. DONALDSON.